May 3, 1966  W. B. COFFMAN  3,249,324
METHOD AND SYSTEM FOR INERTIAL GUIDANCE
Filed Sept. 19, 1958  2 Sheets-Sheet 1

INVENTOR
WILLIAM B. COFFMAN
BY
ATTORNEYS.

May 3, 1966 W. B. COFFMAN 3,249,324
METHOD AND SYSTEM FOR INERTIAL GUIDANCE
Filed Sept. 19, 1958 2 Sheets-Sheet 2
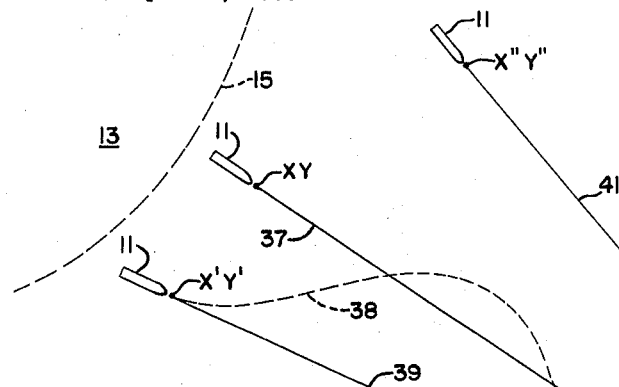
FIG.3.
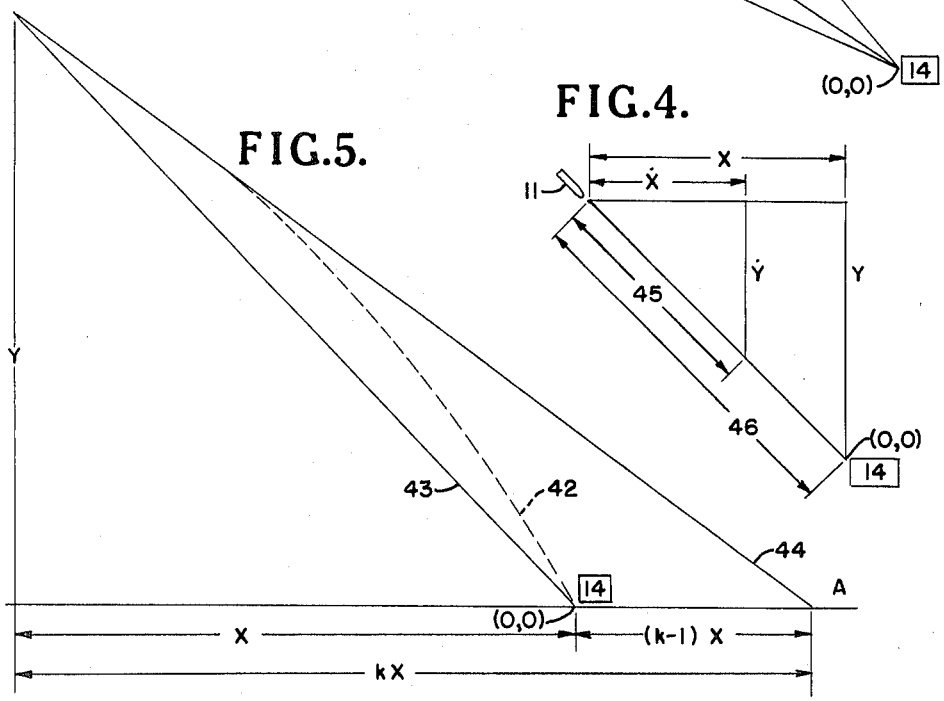
FIG.4.
FIG.5.
INVENTOR
WILLIAM B. COFFMAN
BY
*ATTORNEYS*

United States Patent Office 3,249,324
Patented May 3, 1966

3,249,324
METHOD AND SYSTEM FOR INERTIAL GUIDANCE
William B. Coffman, Silver Spring, Md., assignor to the United States of America as represented by the Secretary of the Navy
Filed Sept. 19, 1958, Ser. No. 762,187
7 Claims. (Cl. 244—14)

The invention described herein may be manufactured and used by or for the Government of the United States of America for governmental purposes without the payment of any royalties thereon or therefor.

This invention relates to automatic craft guidance and more particularly to a system of guiding a short range piloted or pilotless craft toward a preselected target point.

Inertial guidance systems for long range missiles sometimes function in the following manner: the output of each of three orthogonally disposed accelerometers indicates acceleration in a space coordinate system having a selected origin and directionally stabilized axes. This output is integrated once to give velocity and is further integrated to indicate position. The initial values of velocity and position set into the system serve to define the velocity and displacement of an imaginary reference point relative to the missile at the time the missile is launched. This imaginary point is subsequently accelerated by gravity only, hence it follows a path precalculated to pass through the target by virtue of the preset initial conditions. The continuous outputs of the guidance system indicate the velocity and position of the missile relative to the reference point. Control signals are generated to assure that the missile is coincident with and at rest relative to the reference point at rocket cut-off. The atmosphere is thin and therefore produces no appreciable aerodynamic forces on the missile, so that the missile remains coincident with the reference point and is directed toward the target when the missile reenters the more dense atmosphere. Although such a system is suitable for long range missiles, it is unsatisfactory for use at shorter ranges, up to about 500 miles, because atmospheric drag acting upon the missile prevents it from remaining coincident with the reference point which experiences no drag.

The primary object of this invention is to provide a method of guiding a missile toward a target which method is feasible even when an appreciable portion of the missile flight is through the more dense regions of the atmosphere.

A further object is to provide a method of guiding a craft for short ranges.

Another object is to provide a self contained navigation system for incorporation into a missile which system is preset at launching to guide the missile toward a selected target.

Still another object is to provide a simple missile guidance system which automatically compensates for atmospheric conditions as it approaches the target.

A further object is the provision of a guidance system which continuously seeks a glide path appropriate to its instantaneous position rather than attempt to follow a particular path all the way to the target regardless of atmospheric disturbances.

A still further object is the provision of a method of guiding a craft toward a target in a manner which continuously corrects the glide path selected to compensate for the instantaneous position of the craft.

These and other objects will become more clearly apparent when the following specification is read in conjunction with the attendant drawings wherein like numerals designate like or similar parts throughout the drawings in which:

FIG. 3 shows the effect of atmospheric disturbances on the trajectory of a missile flying a straight line path to the target;

FIG. 4 is a representation of the velocity and distance triangles used in steering the craft; and FIG. 5 indicates an alternate trajectory along which the missile may fly.

While the invention will be described with reference to a two coordinate system for the sake of simplicity it is to be understood that the principles of the invention may be employed in three coordinate space simply by inserting a third variable into the computing system.

Briefly, the guidance equation utilized in this invention is $$[1] \qquad k X \dot{Y} - Y \dot{X} = E_s$$

where X is the distance between a preselected impact point and the missile measured parallel to the X axis, Y is the distance between the missile and the target measured parallel to the Y axis, $\dot{X}$ and $\dot{Y}$ are the instantaneous velocities of the missile at point [X,Y] measured in the X and Y direction respectively; $E_s$ is the error signal generated by the guidance system at point [X,Y] and $k$ is a constant which may have a value from 1 to about 1.5.

When the error signal is zero, the missile velocity vector is pointed toward the target; if it is not zero, appropriate control signals are sent to the missile control surfaces to make it zero. Thus the missile establishes a glide path passing through the target; if the missile deviates from this glide path it instantaneously computes a new and different course rather than seeking to reestablish the original path.

Figure 1:
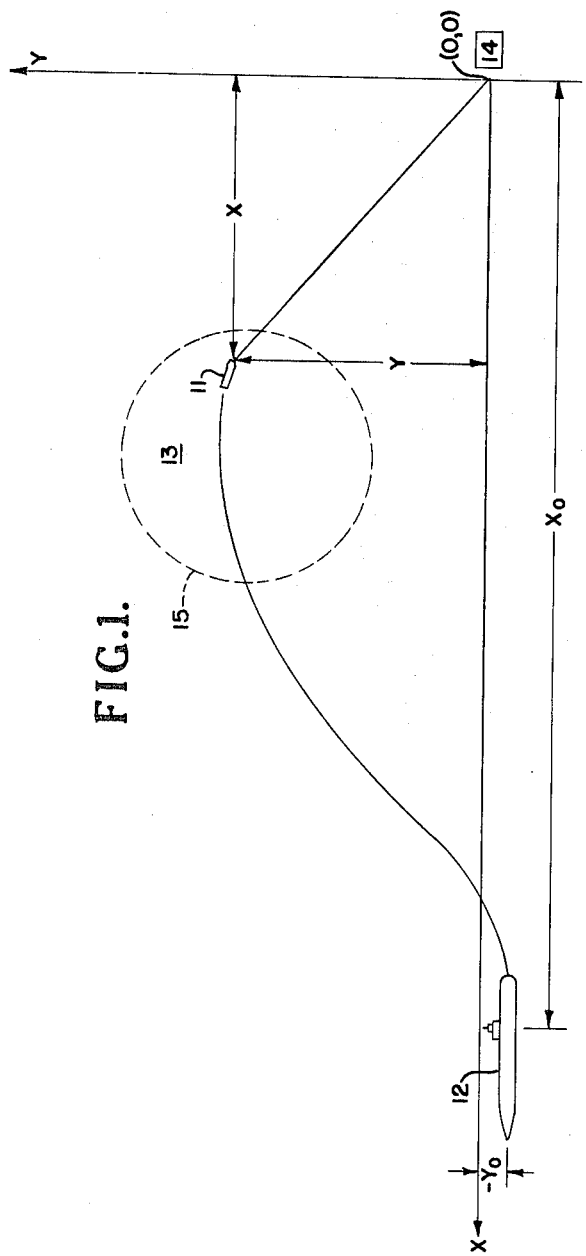
FIG. 1 is a diagrammatic representation of a vessel firing a missile which employs a guidance system constructed according to the principles of this invention.
Figure 2:
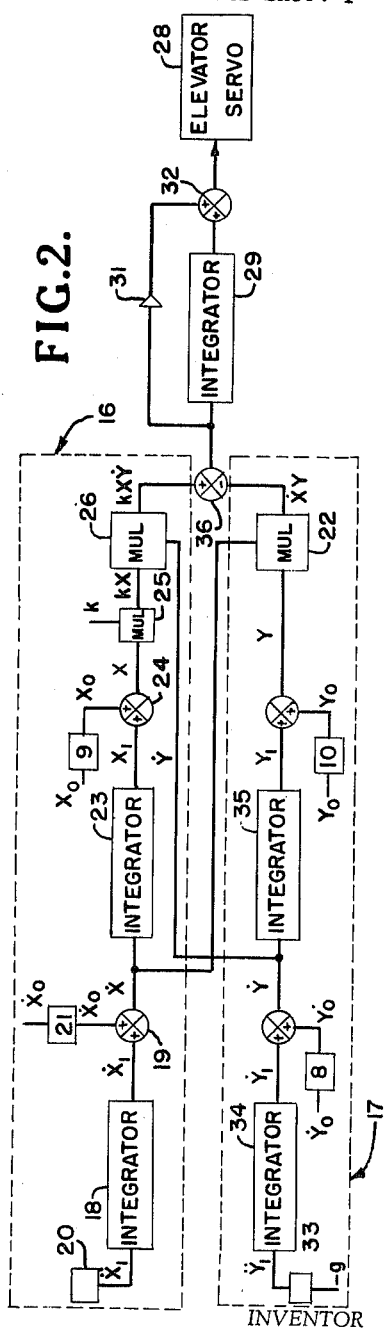
FIG. 2 is a block diagram of the guidance system.

Referring now with greater particularity to FIG. 1, the missile launching vehicle is indicated as a submarine 12, it being understood however that the missile could be launched from moving or stationary land, sea, air or undersea craft. The missile 11 is initially controlled by thrust vectoring or aerodynamic fins which program the missile so that after rocket burnout [or thrust reversal as the case may be] it coasts into region 13 which has an imaginary spherical envelope 15. It should be noted that the missile may enter region 13 before or after it reaches its apogee. When the missile is in region 13, a switch [not shown], operated by time or some criteria such that X has diminished to some selected value; closes to activate the guidance system which commences to steer missile 11 toward a preselected target 14. As indicated in FIG. 1, target 14 is the origin of the X,Y coordinate system employed, so that the launching ship is at point $X_0Y_0$. Depending upon the relative elevation of ship 12 and point 14, $Y_0$ may be positive, negative or zero.

The guidance system is composed of a two channel circuit, X channel 16 and Y channel 17, each of which may include conventional analogue or digital computing components.

In the X channel, accelerometer produces a signal $\ddot{X}_1$ indicative of the missile acceleration with respect to launching craft 12. This signal is integrated by an integrator unit 18 to provide an output correlative to the missile velocity $\dot{X}_1$. Since $\dot{X}_1$ does not take into account the velocity of the craft 12 from which the missile 11 was launched, $\dot{X}_1$ is fed to a summing unit 19 which also has an input $\dot{X}_0$, the X axis velocity of the ship at missile launch. Because $\dot{X}_0$ must be utilized after missile launch, it may be necessary to have a storage unit 21 capable of remembering the value of $\dot{X}_0$, or it may be desirable to employ a mechanical differential gear as the summing unit. In the latter event, the input $\dot{X}_0$ from the ship's fire control system merely turns one of the input shafts to the differential and is locked after firing missile 11. In like manner, outputs correlative to $\dot{Y}_0$, the Y axis velocity of the launching craft, $X_0$ and $Y_0$, the X and Y distances respectively of the launching craft from the target at the time of launch, may be provided by the ship's fire control system and stored for later use in storage elements 8, 9 and 10, respectively.

The output from addition unit 19 is $\dot{X}$, the missile velocity with respect to the target. The output $\dot{X}$ is fed to a multiplier 22 in the Y channel and it is also fed to integrator 23 to provide an output signal $X_1$. In summing unit 24, this signal $X_1$ is added to $X_0$, a signal correlative to the ship's position with respect to target 14, at launching, to produce a signal X indicative of the distance from the missile to the target in the X direction. Signal X is fed to multiplier 25 [1] which multiplies X by a constant $k$ and [2] signal $kX$ is then fed to multiplier 26 which also receive a signal $\dot{Y}$ from the Y channel. The output $kX\dot{Y}$ from multiplier 26 is fed to a subtraction unit 36 which performs the operation $kX\dot{Y} - Y\dot{X}$. The function $kX\dot{Y} - Y\dot{X}$ is used to actuate the missile steering apparatus such as elevators [not shown] via servo 28. If the value of $k$ is 1, it is desirable to integrate the function $kX\dot{Y} - Y\dot{X}$ in unit 29 before it is supplied to the elevator servo 28 since there will be a steady state non-zero value of elevator deflection necessary when the missile is on a glide path toward target 14. That is to say, even when the error signal is zero the elevators will not be set to a zero angle of attack. A slight elevator deflection serves to trim the missile at an angle of attack necessary to maintain the glide path. If $k$ is greater than unity, unit 29 may be omitted, since the missile will fly along path 42 [FIG. 5]. A portion of the error signal $kX\dot{Y} - Y\dot{X}$ bypasses the integrator, is fed to amplifier 31, and added to the output of integration 29 by unit 32.

The Y channel is similar to the X channel except that it includes no multiplier equivalent to multiplier 25. Obviously the Y accelerometer must be biased so that the influence of gravitational acceleration is accounted for. [It is not detected by the accelerometer.] Accelerometer 33 produces a signal $\ddot{Y}_1$ which is integrated in unit 34 to provide $\dot{Y}_1$. The addition unit adds $\dot{Y}_1 + \dot{Y}_0$ to compute $\dot{Y}$ which is fed to multiplier 26 in the X channel and to integrator 35 to produce an output proportional to $Y_1$. The addition unit sums $Y_1$ and $Y_0$ to provide Y, the distance along the Y axis from the missile to the target. Multiplication unit 22 performs the operation $Y\dot{X}$ and this product is transmitted to unit 36 to provide the error signal $kX\dot{Y} - Y\dot{X}$.

If the value of $k$ is selected to equal unity, the missile velocity vector is pointed directly at the target when the error signal equals zero. If the error signal is not zero, appropriate control signals are sent to the aerodynamic control surfaces to make it zero thereby establishing a glide path which passes through the target 14. In the case of any inflight disturbances such as variable winds, the missile seeks a glide path appropriate to its instantaneous position, rather than attempting to follow a predetermined path all the way to the target.

For example, if, as shown in FIG. 3, missile 11 at point XY is following a glide path 37 and is suddenly displaced to a new position X'Y', it does not attempt to reestablish glide path 37 by following course 38. Rather it selects a new glide path 39 which passes through the target 14. On the other hand, if the missile were violently displaced to a third position X"Y" it would fly along path 41 to the target. Thus, by maintaining the missile velocity vector pointed always at the target, the missile follows a glide path which necessarily passes through the target.

Stated in a slightly different manner, the system may be thought to compare the velocity triangle formed by $\dot{X}$, $\dot{Y}$ and the velocity vector, and the distance triangle formed by X, Y and the line 46 connecting the missile and the target. When these triangles are similar and vector 45 is superimposed on line 46, the missile is headed correctly toward the target and the error signal is zero.

Any straight line passing through the target satisfies the guidance system; this mode of guidance is extremely flexible.

In the event it is desirable or necessary that the glide path be curved, the value of $k$ may be increased from 1.0 to any value up to about 1.5. If this is done, the missile heading is not pointed at the target 14 but at point A beyond the target. The distance along the X axis from the missile to the point A is $k$ times the distance from the misile to the target. As the distance to the target decreases, the distance between point A and the target decreases so that at impact point A coincides with the target. Accordingly, in the absence of disturbing forces, the missile flies along a curved path 42 rather than the straight line 43 to the target. Thus by continuously aiming the velocity vector of the missile along a line 44 toward point A, which of course continuously moves toward target 14, the missile may be made to fly a curved trajectory.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An inertial guidance system for steering a missile toward the origin of an XY coordinate system comprising, in combination, an accelerometer providing an output correlative to the missile acceleration in the X direction, X direction integrating means connected to said accelerometer for providing an output correlative to the missile velocity in the X direction, second X direction intergrating means for providing an output correlative to the distance from the missile to the origin measured in the X direction, amplifying means connected to said second X direction integrating means for producing an output which is $k$ times the output of said second integrator means, a second accelerometer providing an output correlative to the missile acceleration in the Y direction, Y direction integrating means connected to said second accelerometer providing an output correlative to the missile velocity in the Y direction, second Y direction integrating means connected to said last named means providing an output correlative to the distance between the missile and the origin measured in the Y direction, multiplying means connected to the output of said amplifying means and to the output of said first Y direction integrating means to provide an output correlative to the product of the outputs thereof, second mutliplying means connected to the output of said first X direction integrating means and said second Y direction integrating means to provide an output correlative to the product of the outputs thereof, subtracting means connected between the output of said first and second multiplying means to provide an output correlative to the output of said first multiplying means minus the output of said second multiplying means and suitable for guiding said missile.

2. A system for steering a craft toward the origin of an XY coordinate system which comprises, integrating means for providing an output correlative to the X velocity, second means connected to said first means for providing an output correlative to the X distance from the origin, means for providing an output correlative to the Y velocity, second integrating means connected to said last named means for providing an output correlative to the Y distance from the origin, means responsive to said outputs for providing a signal correlative to the X distance multipled by the Y velocity minus the Y distance times the X velocity to provide a guidance signal.

3. A guidance system for steering a craft toward a selected point in an XY coordinate system including means for producing outputs correlative to $\dot{X}$ and X, means for producing outputs correlative to $\dot{Y}$ and Y, means for combining said outputs to produce a signal correlative to $X\dot{Y}-Y\dot{X}$, means operable by said signal to guide said craft to said selected point.

4. A missile guidance system for guiding a craft toward a selected point in an XY coordinate system including; means producing outputs proportional to $\dot{X}$ and $k$X where $k$ is a number greater than unity, means producing outputs correlative to $\dot{Y}$ and Y, means interconnected between said first and said second means for combining the outputs thereof to provide a signal correlative to $kX\dot{Y}-Y\dot{X}$, means operable by said signal for altering the course of the craft when $kX\dot{Y}-Y\dot{X}$ is different from zero.

5. The system of claim 4 wherein $k$ is a number from 1.0 to about 1.5.

6. The method of guiding a craft toward a target in an XY coordinate system comprising the steps of; producing signals proportional to the X and Y accelerations respectively, successively integrating said accelerations to produce signals proportional to X and Y velocities and X and Y distances from the target to the craft, combining said velocity and distance signals to produce an error signal which is zero only when the velocity vector is pointed toward the target.

7. The method of guiding a craft toward a target in an XY coordinate system comprising the steps of; producing signals proportional to the X and Y accelerations respectively, successively integrating said accelerations to produce signals proportional to X and Y velocities, the Y distance from the target to the craft, and $k$ times the X distance from the target to the craft, where $k$ equals a number from 1.0 to about 1.5, combining said velocity and distance signals to produce an error signal which is zero only when the velocity vector is pointed at a point on the X axis which is $k$ times the X distance from the craft to the target.

References Cited by the Examiner

UNITED STATES PATENTS

| 2,315,501 | 4/1943 | Crane | 244—77 |
| 2,821,349 | 1/1958 | Sohn | 318—489 |
| 2,932,467 | 4/1960 | Scorgie | 244—14 |
| 2,984,435 | 5/1961 | Faith et al. | 244—14 |
| 3,010,676 | 11/1961 | Shelley | 244—14 |

BENJAMIN A. BORCHELT, *Primary Examiner.*

CHESTER L. JUSTUS, SAMUEL FEINBERG,
*Examiners.*

D. G. REDINBAUGH, A. E. HALL, H. H. HALLACHER, W. C. ROCH, *Assistant Examiners.*